US012553097B2

(12) United States Patent
Gospodinova et al.

(10) Patent No.: US 12,553,097 B2
(45) Date of Patent: Feb. 17, 2026

(54) METHOD FOR PRODUCING A HIGH STRENGTH STEEL SHEET HAVING IMPROVED DUCTILITY AND FORMABILITY, AND OBTAINED STEEL SHEET

(71) Applicant: ArcelorMittal, Luxembourg (LU)

(72) Inventors: Maya Gospodinova, Maizieres-les-Metz (FR); Pavan Venkatasurya, East Chicago, IN (US)

(73) Assignee: ArcelorMittal, Luxembourg (LU)

( * ) Notice: Subject to any disclaimer, the term of this patent is extended or adjusted under 35 U.S.C. 154(b) by 811 days.

(21) Appl. No.: 16/061,776

(22) PCT Filed: Dec. 21, 2016

(86) PCT No.: PCT/EP2016/082088
§ 371 (c)(1),
(2) Date: Jun. 13, 2018

(87) PCT Pub. No.: WO2017/108897
PCT Pub. Date: Jun. 29, 2017

(65) Prior Publication Data
US 2018/0371566 A1 Dec. 27, 2018

(30) Foreign Application Priority Data

Dec. 21, 2015 (WO) .................. PCT/IB2015/059841

(51) Int. Cl.
*C21D 8/02* (2006.01)
*B23K 11/11* (2006.01)
(Continued)

(52) U.S. Cl.
CPC .......... *C21D 8/0247* (2013.01); *C21D 8/0226* (2013.01); *C21D 8/0236* (2013.01);
(Continued)

(58) Field of Classification Search
None
See application file for complete search history.

(56) References Cited

U.S. PATENT DOCUMENTS 7,204,894 B1 * 4/2007 Chase ...................... C21D 1/06
148/601
9,427,939 B2 8/2016 Allain et al.
(Continued)

FOREIGN PATENT DOCUMENTS

CN 103069040 A 4/2013
CN 103620063 A 3/2014
(Continued)

OTHER PUBLICATIONS

Chen, "Hole Expansion Characteristics of Ultra High Strength Steels". Procedia Engineering vol. 81 2014, pp. 718-723. (Year: 2014).*
(Continued)

*Primary Examiner* — Keith Walker
*Assistant Examiner* — Catherine P Smith
(74) *Attorney, Agent, or Firm* — Davidson Kappel LLC

(57) ABSTRACT

A method for producing a steel sheet, the method containing the following successive steps:
providing a cold-rolled steel sheet, the chemical composition of the steel containing in weight %: 0.15%≤C≤0.23%, 2.0%≤Mn≤2.8%, 1.0%≤Si≤2.1%, 0.02%≤Al≤1.0%, with 1.7%≤Si+Al≤2.1%, 0≤Nb≤0.035%, 0≤Mo≤0.3%, 0≤Cr≤0.4%, the remainder being Fe and unavoidable impurities,
annealing the steel sheet at an annealing temperature $T_A$ so as to obtain a structure comprising at least 65% of austenite and up to 35% of intercritical ferrite,
quenching the sheet at a cooling rate of at least 20° C./s from a temperature of at least 600° C. down to a
(Continued)

quenching temperature QT comprised between Ms-170° C. and Ms-80° C., heating the sheet up to a partitioning temperature PT between 350° C. and 450° C. and maintaining the sheet at this temperature for a partitioning time Pt comprised between 80 s and 440 s, immediately cooling the sheet down to the room temperature, the steel sheet having a final microstructure consisting of, in surface fraction:

between 40% and 70% of tempered martensite,
between 7% and 15% of retained austenite,
between 15% and 35% of ferrite,
at most 5% of fresh martensite,
at most 15% of bainite.

15 Claims, 1 Drawing Sheet

(51) Int. Cl.
    *B23K 101/00*     (2006.01)
    *B23K 103/04*     (2006.01)
    *C21D 8/0221*     (2026.01)
    *C21D 8/0247*     (2026.01)
    *C21D 9/46*     (2006.01)
    *C22C 38/00*     (2006.01)
    *C22C 38/02*     (2006.01)
    *C22C 38/04*     (2006.01)
    *C22C 38/06*     (2006.01)
    *C22C 38/22*     (2006.01)
    *C22C 38/26*     (2006.01)
    *C22C 38/38*     (2006.01)

(52) U.S. Cl.
    CPC ............. *C21D 8/0263* (2013.01); *C21D 9/46* (2013.01); *C22C 38/00* (2013.01); *C22C 38/02* (2013.01); *C22C 38/04* (2013.01); *C22C 38/06* (2013.01); *C22C 38/22* (2013.01); *C22C 38/26* (2013.01); *C22C 38/38* (2013.01); *B23K 11/11* (2013.01); *B23K 2101/006* (2018.08); *B23K 2103/04* (2018.08); *C21D 2211/001* (2013.01); *C21D 2211/005* (2013.01); *C21D 2211/008* (2013.01)

(56) References Cited

U.S. PATENT DOCUMENTS

| | | | |
|---|---|---|---|
| 2006/0102256 A1 | 5/2006 | Moulin et al. | |
| 2006/0108035 A1* | 5/2006 | Sun | C22C 38/06 148/603 |
| 2006/0144482 A1 | 7/2006 | Moulin | |
| 2009/0053096 A1* | 2/2009 | Miura | C21D 9/48 420/103 |
| 2010/0104890 A1 | 4/2010 | Satoh et al. | |
| 2010/0307644 A1 | 12/2010 | Gil Otin et al. | |
| 2012/0132327 A1* | 5/2012 | Mukai | C22C 38/14 148/660 |
| 2012/0312433 A1* | 12/2012 | Mizuta | C22C 38/002 420/128 |
| 2013/0133792 A1 | 5/2013 | Nakagaito et al. | |
| 2014/0050941 A1 | 2/2014 | Kawasaki et al. | |
| 2014/0212660 A1* | 7/2014 | Takeda | C22C 38/14 148/333 |
| 2014/0299237 A1* | 10/2014 | Somani | C21D 8/005 148/602 |
| 2014/0322559 A1* | 10/2014 | Becker | C22C 38/06 148/333 |
| 2014/0335374 A1* | 11/2014 | Nakagaito | C22C 38/005 428/659 |
| 2015/0086808 A1 | 3/2015 | Kasuya et al. | |
| 2015/0101712 A1* | 4/2015 | Futamura | C22C 38/002 148/518 |
| 2015/0144231 A1* | 5/2015 | Masuda | C22C 38/38 148/333 |
| 2015/0203947 A1 | 7/2015 | Hasegawa et al. | |
| 2015/0299834 A1* | 10/2015 | Mizuta | C21D 9/46 148/333 |
| 2016/0010168 A1* | 1/2016 | Angles | C22C 38/44 148/664 |
| 2016/0177427 A1 | 6/2016 | Takashima et al. | |
| 2016/0312326 A1 | 10/2016 | Drillet et al. | |
| 2018/0004752 A1 | 1/2018 | Deng et al. | |
| 2018/0044752 A1* | 2/2018 | Murata | C23C 2/28 |
| 2018/0127856 A1* | 5/2018 | Takashima | C21D 6/008 |

FOREIGN PATENT DOCUMENTS

| | | | |
|---|---|---|---|
| EP | 1865085 | A1 | 12/2007 |
| EP | 2325346 | A1 | 5/2011 |
| EP | 2436794 | A1 | 4/2012 |
| EP | 2604715 | A1 | 6/2013 |
| EP | 2762589 | A1 | 8/2014 |
| EP | 2881481 | A1 | 6/2015 |
| RU | 2321667 | C2 | 4/2008 |
| RU | 2341566 | C2 | 12/2008 |
| RU | 2430185 | C2 | 9/2011 |
| RU | 2524743 | C2 | 8/2014 |
| WO | WO2012147898 | A1 | 11/2012 |
| WO | 2015019557 | A1 | 2/2015 |
| WO | 2015087224 | A1 | 6/2015 |

OTHER PUBLICATIONS

Speer, J.G. & Streicher, A.M. & Matlock, David & Rizzo, Fernando & Krauss, George. (2003). Quenching and partitioning: A fundamentally new process to create high strength trip sheet microstructures. Materials Science and Technology 2003 Meeting. 505-522. (Year: 2003).*

The International Search Report issued in connection with International Application No. PCT/IB2015/059841 on Sep. 9, 2016.

The International Search Report issued in connection with International Application No. PCT/EP2016/082088 on Mar. 6, 2017.

The International Preliminary Report on Patentability issued in connection with International Application No. PCT/EP2016/082088 on Mar. 29, 2018.

* cited by examiner

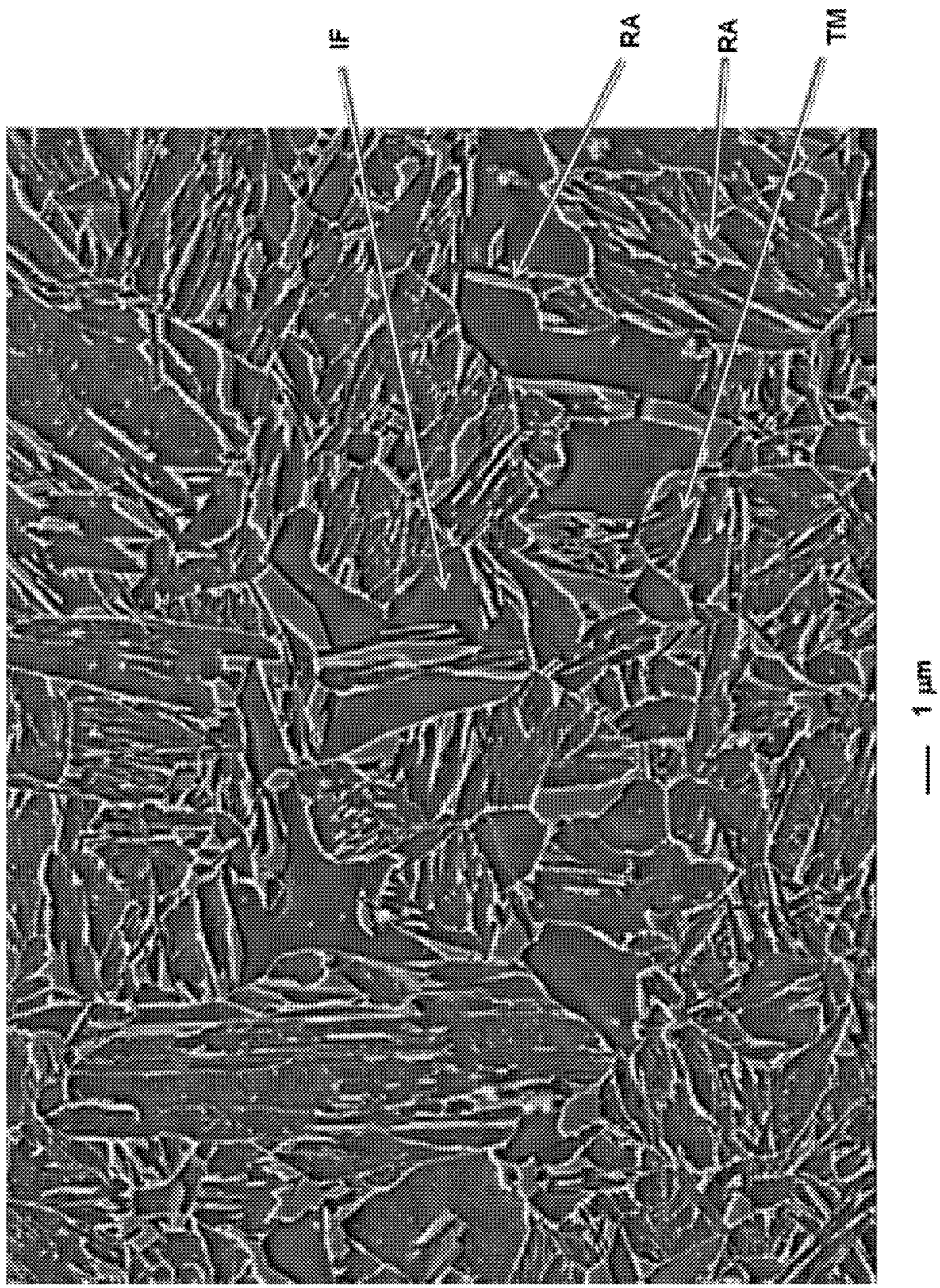

METHOD FOR PRODUCING A HIGH STRENGTH STEEL SHEET HAVING IMPROVED DUCTILITY AND FORMABILITY, AND OBTAINED STEEL SHEET

FIELD OF THE INVENTION

The present invention relates to a method for producing a high strength steel sheet having improved ductility and formability and to a sheet obtained with this method.

BACKGROUND OF THE INVENTION

To manufacture various equipments such as parts of body structural members and body panels for automotive vehicles, it is usual to use sheets made of DP (dual phase) steels or TRIP (Transformation Induced Plasticity) steels.

It is also known to use steels having a bainitic structure, free from carbides precipitates, with retained austenite, containing about 0.2% of C, about 2% of Mn, about 1.7% of Si, with a yield strength of about 750 MPa, a tensile strength of about 980 MPa, a total elongation of about 8%. These sheets are produced on continuous annealing lines by cooling from an annealing temperature higher than the $Ac_3$ transformation point, down to a holding temperature above the Ms transformation point and maintaining the sheet at the temperature for a given time.

BRIEF SUMMARY OF THE INVENTION

To reduce the weight of the automotive in order to improve their fuel efficiency in view of the global environmental conservation, it is desirable to have sheets having improved yield and tensile strengths. But such sheets must also have a good ductility and a good formability and more specifically a good stretch flangeability.

In this respect, it is desirable to have sheets having a tensile strength TS of at least 1180 MPa, a total elongation TE of at least 12%, preferably of at least 13%, and a hole expansion ratio HER of at least 25%, preferably of at least 30%. The tensile strength TS and the total elongation TE are measured according to ISO standard ISO 6892-1, published in October 2009. It must be emphasized that, due to differences in the methods of measurement, in particular due to differences in the geometries of the specimen used, the values of the total elongation TE according to the ISO standard are very different and are in particular lower than the values of the total elongation according to the JIS Z 2201-05 standard. The hole expansion ratio HER is measured according to ISO standard 16630:2009. Due to differences in the methods of measure, the values of hole expansion ration HER according to the ISO standard 16630:2009 are very different and not comparable to the values of the hole expansion ratio A according to the JFS T 1001 (Japan Iron and Steel Federation standard).

It is also desirable to have steel sheets having mechanical properties as mentioned above, in a thickness range from 0.7 to 3 mm, and more preferably in the range of 0.8 to 2 mm.

Therefore, one of the objects of the present invention is to provide a sheet having the desired mechanical properties or features mentioned above, and a method for producing it.

The invention provides a method for producing a steel sheet having a tensile strength of at least 1180 MPa and a total elongation of at least 12%, measured according to the ISO standard 6892-1, and a hole expansion ratio HER of at least 25%. measured according to the ISO standard 16630:2009, wherein the method comprises the following successive steps:

providing a cold-rolled steel sheet, the chemical composition of the steel containing in weight %:
 0.15%≤C≤0.23%,
 2.0%≤Mn≤2.8%,
 1.0%≤Si≤2.1%,
 0.02%≤Al≤1.0%,
 with 1.7%≤Si+Al≤2.1%,
 0≤Nb≤0.035%,
 0≤Mo≤0.3%,
 0≤Cr≤0.4%,
 the remainder being Fe and unavoidable impurities, annealing the steel sheet at an annealing temperature $T_A$ so as to obtain a structure comprising at least 65% of austenite and up to 35% of intercritical ferrite, quenching the sheet at a cooling rate of at least 20° C./s from a temperature of at least 600° C. down to a quenching temperature QT comprised between Ms-170° C. and Ms-80° C., heating the sheet up to a partitioning temperature PT between 350° C. and 450° C. and maintaining the sheet at this temperature for a partitioning time Pt comprised between 80 s and 440 s, immediately cooling the sheet down to the room temperature, the steel sheet having a final microstructure consisting of, in surface fraction:
 between 40% and 70% of tempered martensite, the tempered martensite having a C content lower than 0.45%,
 between 7% and 15% of retained austenite,
 between 15% and 35% of ferrite,
 at most 5% of fresh martensite,
 at most 15% of bainite.

In one embodiment, the method comprises, between the annealing step and the quenching step, a step of slow cooling the sheet at a cooling rate lower than 5° C./s for at least 70 s, down to a temperature higher than or equal to 600° C.

In this embodiment, the ferrite comprises, in area fraction with respect to the whole structure, between 0% and 15% of intercritical ferrite and between 0% and 35% of transformation ferrite, said transformation ferrite being formed during the slow cooling step.

Preferably, the C content in the tempered martensite is lower than 0.03%.

Preferably, the quenched sheet has, before the heating to the partitioning temperature PT, a structure consisting of, in surface fraction:
 between 15% and 35% of ferrite,
 between 10% and 30% of austenite,
 between 40% and 70% of martensite,
 at most 15% of lower bainite.

In one embodiment, the step of providing said cold-rolled steel sheet comprises:
 hot rolling a sheet made of said steel to obtain a hot rolled steel sheet,
 coiling said hot-rolled steel sheet at a temperature Tc comprises between 400° C. and 750° C.,
 performing a batch annealing at a temperature THBA comprised between 500° C. and 700° C. for a time between 2 and 6 days,
 cold rolling said hot-rolled steel sheet to obtain said cold-rolled steel sheet.

Preferably, after the sheet is quenched to the quenching temperature QT and before the sheet is heated to the partitioning temperature PT, the sheet is held at the quenching temperature QT for a holding time comprised between 2 s and 8 s, preferably between 3 s and 7 s.

The chemical composition of the steel preferably satisfies at least one of the following conditions:
 C≥0.16%,
 C≤0.21%,
 Mn≥2.2%, Mn≤2.7%, 0.010%≤Nb, Mo≤0.05%, or Mo≥0.1%, Cr≤0.05%, or Cr≥0.1%.

In one embodiment, the chemical composition of the steel is such that C+Si/10≤0.30% and Al≥6(C+Mn/10)−2.5%.

In this embodiment, the chemical composition of the steel is preferably such that 1.0%≤Si<1.3% and 0.5%<Al≤1.0%, still preferably such that 1.0%≤Si≤1.2% and 0.6%≤Al≤1.0%.

For example, after the step of cooling down the steel sheet to the room temperature, the steel sheet is coated by an electrochemical method or through a vacuum coating process.

For example, the steel sheet is coated with Zn or a Zn alloy.

In another embodiment, the chemical composition of the steel is such that 1.3%≤Si≤2.1% and 0.02%≤Al≤0.5%.

The invention also provides a process for producing a part made of at least two pieces made of steel sheets assembled by resistance spot welding, said process comprising:

providing a first piece made of a first steel sheet produced by a method according to the invention, such that C+Si/10≤0.30% and Al≥6(C+Mn/10)−2.5%, the first steel sheet being coated with Zn or a Zn alloy, providing a second piece made of a steel sheet having a composition such that C+Si/10≤0.30% and Al≥6 (C+Mn/10)−2.5%, resistance spot welding said first piece made of said first steel sheet to said second piece made of a steel sheet.

The invention also provides a steel sheet, wherein the chemical composition of the steel contains in weight %:
 0.15%≤C≤0.23%,
 2.0%≤Mn≤2.8%,
 1.0%≤Si≤2.1%,
 0.02%≤Al≤1.0%,
 with 1.7%≤Si+Al≤2.1%,
 0≤Nb≤0.035%,
 0≤Mo≤0.3%,
 0≤Cr≤0.4%,
 remainder being Fe and unavoidable impurities,
 d steel sheet having a microstructure consisting of, in surface fraction:
 ween 40% and 70% of tempered martensite, the tempered martensite having a C content lower than 0.45%,
 between 7% and 15% of retained austenite,
 between 15% and 35% of ferrite,
 at most 5% of fresh martensite,
 at most 15% of bainite.

In one embodiment, the ferrite comprises, with respect to the whole structure, between 0% and 15% of intercritical ferrite and between 0% and 35% of transformation ferrite.

Preferably, the C content in the tempered martensite is lower than 0.03%.

Preferably, the C content in the retained austenite is comprised between 0.9% and 1.2%.

Preferably, the steel sheet has a yield strength of at least 900 MPa, a tensile strength of at least 1180 MPa and a total elongation of at least 12%, measured according to ISO standard 6892-1, and a hole expansion ratio HER of at least 25%, measured according to the ISO standard 16630:2009.

Still preferably, the yield strength is of at most 1090 MPa. Indeed, a yield strength of at most 1090 MPa guarantees a high formability.

Preferably, the chemical composition of the steel satisfies at least one of the following conditions:

C≥0.16%,

C≤0.21%,

Mn≥2.2%,

Mn≤2.7%, 0.010%≤Nb,

Mo≤0.05%, or

Mo≥0.1%,

Cr≤0.05%, or

Cr≥0.1%.

In one embodiment, the chemical composition of the steel is such that C+Si/10≤0.30% and Al≥6 (C+Mn/10)−2.5%.

In this embodiment, the chemical composition of the steel is preferably such that 1.0%≤Si<1.3% and 0.5%<Al≤1.0%, still preferably such that 1.0%≤Si<1.2% and 0.6%≤Al≤1.0%.

In another embodiment, the chemical composition of the steel is such that 1.3%≤Si≤2.1% and 0.02%≤Al≤0.5%.

In certain embodiments, the steel sheet is coated with Zn or a Zn alloy, the coating resulting from the use of a electrochemical method or a vacuum coating process.

The thickness of said steel sheet is for example comprised between 0.7 and 3 mm, preferably between 0.8 and 2 mm.

The invention also provides a welded structure comprising at least ten resistance spot welds of at least two parts made of steel sheets, wherein a first steel sheet is according to the invention, has a chemical composition of the steel such that C+Si/10≤0.30% and Al≥6 (C+Mn/10)−2.5%, and is coated with Zn or a Zn alloy, and a second steel sheet has a composition such that C+Si/10≤0.30% and Al≥6 (C+Mn/10)−2.5%, and the mean number of cracks per resistance spot weld is less than 6.

Preferably, the second steel sheet is according to the invention and is coated with Zn or a Zn alloy.

The invention encompasses the use of a steel sheet manufactured according to the invention, or of a steel sheet according to the invention, for the manufacture of structural parts in motor vehicles.

The invention also encompasses the use of a resistance spot weld produced according to the invention, or of a welded structure according to the invention, for the manufacture of structural parts in motor vehicles.

The invention will now be described in details but without introducing limitations, with reference to the appended FIGURE.

BRIEF DESCRIPTION OF THE DRAWINGS

FIG. 1 is a micrograph of the microstructure of example 3.

DETAILED DESCRIPTION OF THE INVENTION

The composition of the steel according to the invention comprises, in weight percent:

0.15% to 0.23% of carbon, for ensuring a satisfactory strength and improving the stability of the retained austenite which is necessary to obtain a sufficient elongation.

Preferably, the carbon content is higher than or equal to 0.16%, and/or preferably lower than or equal to 0.21%. If the carbon content is too high, the hot rolled sheet is too hard to cold roll and the weldability is insufficient. If the carbon content is below 0.15%, the tensile strength will not reach 1180 MPa.

2.0% to 2.8% of manganese. The minimum is defined to have a sufficient hardenability in order to obtain a microstructure containing at least 40% of tempered martensite, and a tensile strength of more than 1180 MPa. The maximum is defined to avoid having segregation issues which are detrimental for the ductility. Preferably, the manganese content is higher than or equal to 2.2%, and/or lower than or equal to 2.7%.

1.0% to 2.1% of silicon and 0.02% to 1.0% of aluminum, the sum of the silicon and aluminum contents being comprised between 1.7% and 2.1%.

A certain amount of aluminum is combined with oxygen as $Al_2O_3$, and with nitrogen as AlN; this amount depends on O and N contents and remains less than 0.025%. The remainder if it exists is not combined and consists in "free aluminum".

The aluminum which is combined with oxygen results from the deoxidation in the liquid stage. It is detrimental for to the ductility properties and therefore, its content has to be limited as much as possible.

The aluminum which is combined with nitrogen slows down the austenitic grains growth during annealing. Nitrogen is a residual element resulting from the smelting and is less than 0.010% in the steel sheet.

After heating in the austenitic range, the inventors have found that Si and free Al stabilize the austenite by delaying the formation of carbides. This occurs in particular if the steel sheet is cooled at a temperature so as to obtain a partial martensitic transformation, and immediately reheated and maintained at a temperature PT during which the carbon is redistributed from martensite to austenite. If Si and free Al content additions are in sufficient amount, the carbon redistribution occurs without significant carbides precipitation. For this purpose, Si+Al has to be more than 1.7% in weight (but less than 2.1%). Moreover, Si provides a solid solution strengthening and improves the hole expansion ratio. In addition, the sum of the Si and Al contents must be of at least 1.7% to obtain a tensile strength of at least 1180 MPa, in combination with a total elongation of at least 12% and a hole expansion ratio of at least 25%. But the Si content has to be limited to 2.1% to avoid the formation of silicon oxides at the surface of the sheet which would be detrimental to the coatability.

Moreover, the inventors have found that when $Si/10 \geq 0.30\% - C$ (Si and C being expressed in weight percentage), due to the LME (liquid metal embrittlement phenomenon), silicon is detrimental to the spot welding of coated sheets and particularly to galvanized or galvannealed or electrogalvanized sheets. LME occurrence causes cracks at the grain boundaries in the Heat Affected Zones and in the weld metal of welded joints. Therefore, (C+Si/10) has to be maintained less than or equal to 0.30%, especially is the sheet is to be coated. The inventors have also discovered that to reduce the LME sensitivity of the steel, for the domain of composition which is considered, the Al, C and Mn contents have to be such that $Al \geq 6(C+Mn/10)-2.5\%$.

Thus, according to a first embodiment, particularly when LME is not likely to appear, Al is added only to deoxidize or optionally to control the austenitic grains growth during annealing and its content remains less than 0.5%, for example less than 0.1%, but is preferably at least 0.020%. According to this first embodiment, the Si content is between 1.3% and 2.1%. In this embodiment, C+Si/10 can be higher than 0.30%.

According to a second embodiment, particularly when the problem of LME has to be considered, $C+Si/10 \leq 0.30\%$. This condition can limit too much the Si content bearing in mind its effect on the carbides formation. Moreover, the composition has to satisfy the condition defined by the formula $Al \geq 6(C+Mn/10)-2.5\%$. Thus, Al is added in more important quantities, in order to replace at least partly Si to stabilize austenite. In this second embodiment, the Al content is comprised between 0.5% and 1.0%, preferably between 0.6% and 1.0%, and Si is comprised between 1.0% and 1.3%, preferably 1.0% and 1.2%. Preferably, the Al content is higher than or equal to 0.7%. However, the Al content is limited to 1.0% in order to prevent the increase of the Ac3 transformation temperature, which would imply higher cost when heating at high temperature for obtaining austenitization of the steel sheet in the annealing step. In this second embodiment, $C+Si/10 \leq 0.30\%$ implies that $C \leq 0.20\%$.

Optionally from 0.010% to 0.035% of niobium, in order to refine the austenite grains during hot-rolling and to provide precipitation strengthening. A Nb content of 0.010% to 0.035% makes it possible to obtain satisfactory yield strength and elongation, in particular a yield strength of at least 900 MPa.

0% to 0.3% of molybdenum and/or 0% to 0.4% of chromium. Mo and Cr may be added to increase the hardenability and to stabilize the retained austenite in order to strongly reduce austenite decomposition during partitioning. According to an embodiment, the molybdenum and the chromium can be eliminated and their contents can remain less than 0.05% each, a content of less than 0.05% corresponding to the presence of Cr or Mo as impurities. When Mo and/or Cr are voluntarily added, their content is of at least 0.1%.

The balance is iron and residual elements resulting from the steelmaking. In this respect, Ni, Cu, Ti, V, B, S, P and N at least are considered as residual elements which are unavoidable impurities. Therefore, their contents are less than 0.05% for Ni, 0.03% for Cu, 0.007% for V, 0.0010% for B, 0.005% for S, 0.02% for P and 0.010% for N. The Ti content is limited to 0.05% because above such values, large-sized carbonitrides would precipitate mainly in the liquid stage and the formability of the steel sheet would decrease, making the 12% target for the total elongation according to ISO 6892-1 more difficult to reach.

When the sheets are coated with Zn or Zn alloys, the hot spot weldability can be affected by the LME phenomenon (Liquid Metal Embrittlement).

The sensitivity of a particular steel sheet to this phenomenon can be evaluated by tensile test performed at high temperature. In particular, this hot tensile test can be performed using a Gleeble RPI thermal simulator, such device being known per se in the art.

This test which is named "Gleeble LME test" is described as follows:

samples of a coated sheet to be tested having a thickness from 0.7 mm to 3 mm are submitted to high temperature tensile tests in order to determine which is the minimal critical displacement for which cracking around the welded zone occur. The samples which are cut in the sheet have a calibrated zone which is 10 mm long and 10 mm wide, and heads which are 40 mm long and 30 mm wide, the radius of curvature between the heads and the calibrated part being 5 mm.

the high temperature tensile tests are performed by heating rapidly (1000° C./s) each sample, maintaining the sample at a predetermined temperature and submitting the heated sample to a predetermined elongation or displacement, then cooling down the sample in air, the elongation or displacement being maintained. After cooling, the samples are observed in order to determine if there is LME cracking or not. It is determined that the sample has a crack if at least one crack of at least 2 mm is formed on the sample.

the tests are made at a plurality of predetermined temperatures, such as 700° C., 750° C., 800° C., 850° C., 900° C. and 950° C., and with elongations or displacements of 0.5 mm, 0.75 mm, 1 mm, 1.25 mm, 1.5 mm, 1.75 mm, 2 mm, and so on; the elongations or displacements are the elongations or displacements of the jaws maintaining the samples on the Gleeble simulator, the critical displacement for cracking onset is reported and the minimum critical displacement, i.e. the minimum displacement for which cracking occurs, is determined for the considered temperature range.

Usually, it is considered that when the minimum critical displacement is less than 1.5 mm at a temperature between 700° C. and 800° C., the probability to observe many LME cracks in the resistance spot welds is high, and when the minimum critical displacement is at least 1.5 mm, the probability to observe many LME cracks in the resistance spot welds is low.

In this respect, the inventors have discovered that for steels corresponding to the present invention or similar to these steels, if the composition is such that C+Si/10 is less than or equal to 0.30%, and Al is higher than or equal to 6(C+Mn/10)−2.5%, the minimum critical displacement is at least 1.5 mm and when C+Si/10 is higher than 0.30%, and/or Al is lower than to 6(C+Mn/10)−2.5%, the minimum critical displacement is less than 1.5 mm, and even less than 1 mm.

Another method for evaluating the spot weldability of the coated sheets is a "LME resistance spot welding test" which allows determining the probability to observe a high number of cracked welds resulting from LME in an important number of resistance spot welds, for example in an industrial production of products comprising parts which are assembled by resistance spot welding such as, for example, car bodies.

This "LME resistance spot welding test" is derived from the electrode life test for resistance spot welding in which a plurality of resistance spot welds, for example 30, is performed on three sheets superposed together: the sheet to be tested and two support sheets made of galvanized low carbon sheets, for example DX54D+Z according to EN 10346. The thicknesses of the sheets are 1.6 mm and the resistance spot welds are made according to the ISO Standard 18278-2 for heterogeneous assemblies. The parameters are:

electrode tip diameter: 8 mm,
welding force: 4.5 kN,
welding time: 3 pulses of 180 ms separated by 40 ms periods (cool times),
holding time: 400 ms.

For this test, in order to determine the eventual occurrence of cracks in the resistance spot welds, the samples are cut and polished. The resistance spot welds are then etched with picric acid, and observed by microscope, for example with a 200× magnification, in order to determine the number of cracks in each observed resistance spot welds and the sum of the length of the cracks in each resistance point weld.

For examples having a composition such that C+Si/10≤0.30% and C+Si/10>0.30%, respectively, Al being more than 6(C+Mn/10)−2.5% in any case, the proportions of the numbers of cracks for each resistance spot weld are as follow:

C+Si/10≤0.30%: Gleeble LME test>1.5 mm, 80% of the resistance spot welds have less than 10 cracks, 0% have 20 or more cracks, C+Si/10>0.30%: Gleeble LME test<1.5 mm, only 40% of the resistance spot welds have less than 10 cracks, and 30% have 20 or more cracks.

If the mean number of cracks in each resistance spot weld is considered, the results are as follows:

for compositions such that C+Si/10≤0.30%, the mean number of cracks in each resistance spot weld is less than 6, for compositions such that C+Si/10>0.30%, the mean number of cracks in each resistance spot weld is higher than 6.

Hot rolled sheet having a thickness between 2 and 5 mm can be produced in a known manner from the steel composition of the invention mentioned above. As an example, the reheating temperature before rolling can be comprised between 1200° C. and 1280° C., preferably about 1250° C., the finish rolling temperature is preferably comprised between Ar3 and 950° C., preferably more than 850° C., and the coiling is performed at a temperature preferably comprised between 400° C. and 750° C.

After the coiling, the sheet has a ferrito-pearlitic or ferrito-pearlito-bainitic structure.

After the coiling, the sheet is batch annealed in order to reduce the hardness of the steel sheet and therefore improve the cold-rollability of the hot-rolled and coiled steel sheet.

For example, the hot-rolled and coiled steel sheet is batch annealed at a temperature between 500° C. and 700° C., for example between 540° C. and 640° C., for a time between 2 and 6 days, preferably between 3 and 5 days.

The sheet can be pickled and cold rolled to obtain a cold rolled sheet having a thickness between 0.7 mm and 3 mm, for example in the range of 0.8 mm to 2 mm.

Then, the sheet is heat treated on a continuous annealing line.

The heat treatment comprises the steps of:

annealing the sheet at an annealing temperature $T_A$ such that, at the end of the annealing step, the steel has a structure comprising at least 65% of austenite, and up to 100%, and from 0% to 35% of intercritical ferrite. One skilled in the art knows how to determine the annealing temperature $T_A$ from dilatometry tests or by using semi-empirical formulae. Preferably, the annealing temperature $T_A$ is of at most Ac3+50° C., in order to limit the coarsening of the austenitic grains. Ac3 designates the temperature of the end of the transformation into austenite during the heating step. Still preferably, the annealing temperature $T_A$ is of at most Ac3. The sheet is maintained at the annealing temperature i.e. maintained between $T_A$−5° C. and $T_A$+5° C., for an annealing time $t_A$ preferably of more than 60 s, still preferably more than 80 s, but which does not need to be of more than 300 s.

optionally slow cooling the sheet from the annealing temperature $T_A$ to a cooling stop temperature, at a cooling rate lower than 10° C./s, preferably lower than 5° C./s, so as to obtain a total ferrite fraction comprised between 15% and 35%, without forming pearlite or bainite. The slow cooling is for example performed for a time comprised between 70 s and 150 s. This slow cooling steps aims at forming ferrite, in particular if the fraction of intercritical ferrite is lower than 15%. In that case, the fraction of ferrite formed during the slow cooling is higher than or equal to 15%-IF, IF being the fraction of intercritical ferrite, and lower than or equal to 35%-IF. If the fraction of intercritical ferrite is at least 15%, the slow cooling is optional. In any case, the fraction of ferrite formed during the slow cooling is lower than or equal to 35%-IF, so that the total ferrite fraction remains of at most 35%. The cooling stop temperature is preferably comprised between 750° C. and 600° C. Indeed, a cooling stop temperature higher than 750° C. does not allow the formation of enough ferrite, whereas a cooling stop temperature lower than 600° C. may lead to the formation of bainite. The ferrite which may be formed during the slow cooling step, further called "transformation ferrite", is different from the intercritical ferrite which remains in the structure at the end of the annealing step. In particular, contrarily to the transformation ferrite, the intercritical ferrite is polygonal. Besides, the transformation ferrite is enriched in carbon and manganese, i.e. has carbon and manganese contents which are higher than the average carbon and manganese contents of the steel, and higher than the carbon and manganese contents of the intercritical ferrite. The intercritical ferrite and the transformation ferrite can therefore be differentiated by observing a micrograph with a FEG-TEM microscope using secondary electrons, after etching with metabisulfite. On the micrograph, the intercritical ferrite appears in medium grey, whereas the transformation ferrite appears in dark grey, owing to its higher carbon and manganese contents. For each particular composition of the steel, one skilled in the art knows how to determine precisely the slow cooling conditions suitable to obtain the desired transformation ferrite fraction. The formation of transformation ferrite allows controlling more accurately the area fraction of ferrite in the final structure, and thus provides robustness.

just after the annealing or the slow cooling step, quenching the sheet by cooling down from a temperature of at least 600° C. to a quenching temperature QT lower than the Ms transformation point of the austenite remaining after annealing and slow cooling, at a cooling rate fast enough to avoid the formation of upper and granular bainite. The quenching temperature QT is comprised between Ms-80° C. and Ms-170° C. The cooling rate is at least 20° C./s, preferably at least 50° C./s. For each particular composition of the steel and each structure, one skilled in the art knows how to determine the Ms transformation point of the austenite remaining after annealing and slow cooling. He also knows how to determine the quenching temperature adapted to obtain a desired structure, just after quenching, consisting of between 15% and 35% of the sum of intercritical ferrite and transformation ferrite, between 10% and 30% of austenite, and between 40% and 70% of martensite, the remainder, if any, being lower bainite which, in any case, is less than 15%. Generally, the quenching temperature lies between 180° C. and 260° C. If the quenching temperature QT is lower than Ms-170° C., the fraction of tempered (or partitioned) martensite in the final structure is too high to stabilize a sufficient amount of retained austenite above 7%, so that the total elongation according the ISO standard 6892-1 does not reach 12%. Moreover, if the quenching temperature QT is higher than Ms-80° C., the fraction of tempered martensite in the final structure is too low to obtain the desired tensile strength. Preferably, the quenching temperature QT is comprised between 200° C. and 250° C.

optionally holding the quenched sheet at the quenching temperature QT for a holding time comprised between 2 s and 8 s, preferably between 3 s and 7 s, so as to avoid the formation of auto-tempered martensite.

reheating the sheet from the quenching temperature up to a partitioning temperature PT comprised between 350° C. and 450° C., and preferably between 375° C. and 450° C., still preferably between 400° C. and 440° C. The reheating rate can be high when the reheating is performed by induction heating, for example between 6 and 13° C./s. If the partitioning temperature PT is higher than 450° C. or lower than 350° C., the elongation of the final product is not satisfactory.

maintaining the sheet at the partitioning temperature PT for a partitioning time Pt comprised between 80 s and 440 s, preferably between 170 s and 430 s. During this partitioning step, the carbon is partitioned, i.e. diffuses from the martensite into the austenite, which is thus enriched.

immediately after this maintaining step, cooling the sheet to the room temperature, at a cooling speed preferably higher than 1° C./s, for example between 2° C./s and 20° C./s.

optionally, after cooling down to the room temperature, the sheet can be coated by electrochemical methods, for example electro-galvanizing, or through any vacuum coating process, like PVD or Jet Vapor Deposition. Any kind of coatings can be used and in particular, zinc or zinc alloys, like zinc-nickel, zinc-magnesium or zinc-magnesium-aluminum alloys.

This heat treatment allows obtaining a final structure i.e. after partitioning and cooling to the room temperature, consisting of:

retained austenite, with a surface fraction comprised between 7% and 15%, tempered martensite, with a surface fraction comprised between 40% and 70%, ferrite, with a surface fraction comprised between 15% and 35%, the ferrite including, with respect to the whole structure, between 0% (included) and 35% of intercritical ferrite and between 0% (included) and 35% of transformation ferrite. According to a first embodiment, the ferrite consists of intercritical ferrite. According to a second embodiment, the ferrite comprises intercritical ferrite and transformation ferrite, for example between 0% and 15% of intercritical ferrite and between 0% (excluded) and 35% of transformation ferrite, at most 5% of fresh martensite, at most 15% of bainite, including lower bainite.

A fraction of retained austenite of at least 7% and a fraction of ferrite comprised between 15% and 35% allow obtaining a total elongation of at least 12% according to ISO 6892-1.

Furthermore, this treatment allows obtaining an increased C content in the retained austenite, which is of at least 0.9%, preferably even of at least 1.0%, and up to 1.2%.

The martensite comprises fresh martensite, and tempered martensite.

The tempered martensite, which is partitioned martensite, has a C content less than 0.45%, this content resulting from the partitioning of carbon from martensite towards austenite during the partitioning step. Especially, this content results from the partitioning of carbon, from the martensite formed during the quenching, towards the austenite.

A C content in the tempered (or partitioned) martensite lower than 0.45% is necessary to guarantee a sufficient stabilization of the austenite, and therefore a total elongation of at least 12%. In addition, a C content in the tempered martensite higher than or equal to 0.45% would lead to the precipitation of carbides within the martensite, increasing the yield strength. Therefore, a C content in the martensite lower than 0.45% allows achieving a yield strength of at most 1090 MPa, and therefore a high formability of the steel sheet.

The C content in the tempered martensite is generally of lower than 0.03%. A C content in the tempered martensite lower than 0.03% guarantees an optimum stabilization of the austenite, which does not transform into martensite during the hole expansion ratio test, and therefore guarantees a hole expansion ratio HER of at least 25%.

The fresh martensite, which results from the transformation of enriched austenite to martensite after the partitioning step, has a C content which is of at least 0.9%, generally at most 1.2%.

Preferably, the fraction of fresh martensite in the structure is lower than or equal to 5%. Indeed, a fraction of fresh martensite higher than 5% would lead to a hole expansion ratio HER according to ISO 16630:2009 lower than 25%.

With this heat-treatment, steel sheets having a yield strength YS of at least 900 MPa, a tensile strength TS of at least 1180 MPa, a total elongation TE according to ISO standard 6892-1 of at least 12%, and even higher than 13%, and a hole expansion ratio HER according to the ISO standard 16630:2009 of at least 25%, and even at least 30%, can be obtained.

EXAMPLES

As examples and comparison, sheets made of steels compositions according to table I, have been manufactured, the elements being expressed in weight. The transformation temperatures such as Ac1 and Ac3 are reported in table I. Ac1 and Ac3 were measured by dilatometry.

TABLE I

| Steel | C (%) | Mn (%) | Si (%) | Al (%) | Si + Al (%) | Nb (%) | Cr (%) | Mo (%) | (C + Si/10) (%) | Ac1 (° C.) | Ac3 (° C.) |
|---|---|---|---|---|---|---|---|---|---|---|---|
| a | 0.18 | 2.5 | 1.2 | 0.6 | 1.8 | 0.02 | res. | res. | 0.3 | 731 | 923 |
| b | 0.18 | 2.5 | 1.7 | 0.03 | 1.7 | res. | res. | res. | 0.35 | 760 | 910 |
| c | 0.18 | 2.5 | 1.7 | 0.03 | 1.7 | 0.02 | res. | res. | 0.35 | 785 | 905 |
| d | 0.16 | 2.7 | 2.05 | 0.03 | 2.08 | res. | res. | res. | 0.365 | nd | 930 |
| e | 0.2 | 1.5 | 1 | 0.5 | 1.5 | 0.03 | 0.2 | 0.2 | 0.12 | 655 | 939 |
| f | 0.22 | 2.0 | 0.8 | 0.7 | 1.5 | 0.02 | 0.1 | 0.15 | 0.10 | 765 | 909 |

In this Table, "res." means that the element is only present as a residual, and that no voluntary addition of this element was made, and "nd" means that the value was not determined. The underlined values are not in accordance with the invention.

The sheets were hot-rolled, then coiled at 450° C. (examples 1-6 and 9-10) or 730° C. (examples 7 and 8). The sheets were batch annealed for 4 days at 550° C. or 650° C. The sheets, after batch-annealing, were pickled and cold rolled to obtain sheets having a thickness of 1.2 mm (examples 1-6 and 9-10) or 1.6 mm (examples 7 and 8), annealed, quenched, partitioned and cooled to the room temperature.

The conditions of treatment are reported in Table II.

In table II, THBA is the batch annealing temperature, TA is the annealing temperature, $t_o$ is the annealing time, Ms the Ms temperature, QT the quenching temperature, PT the partitioning temperature, Pt the partitioning time.

The microstructures and the mechanical properties are reported in Table III.

In Table III, TM is the surface fraction of tempered martensite, FM is the surface fraction of fresh martensite, B is the surface fraction of bainite, IF is the surface fraction of intercritical ferrite, F is the total surface fraction of ferrite (intercritical ferrite+transformation ferrite), and RA is the surface fraction of retained austenite.

Measured properties are the Hole expansion ratio HER measured according to the standard ISO 16630:2009, the yield strength YS, the tensile stress TS, the uniform elongation UE and the total elongation TE. The yield strength YS, the tensile stress TS, the uniform elongation UE and the total elongation TE were measured according to the ISO standard ISO 6892-1, published in October 2009.

All examples are related to uncoated sheets.

TABLE II

| Example | Steel | THBA (° C.) | $T_A$ (° C.) | $t_A$ (s) | Ms (° C.) | QT (° C.) | PT (° C.) | Pt (s) |
|---|---|---|---|---|---|---|---|---|
| 1 | a | 550 | 870 | 100 | 367 | 230 | 400 | 200 |
| 2 | a | 550 | 870 | 100 | 367 | 200 | 400 | 200 |
| 3 | a | 550 | 850 | 100 | 351 | 200 | 400 | 200 |
| 4 | b | 550 | 850 | 100 | 352 | 250 | 440 | 200 |
| 5 | b | 650 | 850 | 100 | 335 | 250 | 440 | 200 |
| 6 | c | 550 | 850 | 100 | 352 | 250 | 440 | 200 |
| 7 | d | 650 | 870 | 188 | 350 | 250 | 450 | 433 |
| 8 | d | 650 | 870 | 79 | 350 | 250 | 450 | 181 |
| 9 | e | 550 | 830 | 100 | 380 | 200 | 400 | 300 |
| 10 | f | 550 | 850 | 100 | 370 | 220 | 440 | 200 |

TABLE III

| Example | Steel | TM (%) | FM (%) | IF (%) | F (%) | RA (%) | B (%) | YS (MPa) | TS (MPa) | UE (%) | TE (%) | HER (%) |
|---|---|---|---|---|---|---|---|---|---|---|---|---|
| 1 | a | 65 | 3 | 16 | 19 | 11 | 2 | 1088 | 1215 | 9.0 | 13.5 | 25 |
| 2 | a | 70 | 2 | 16 | 19 | 8 | 1 | 1039 | 1201 | 9.8 | 14 | 31 |
| 3 | a | 59 | 3 | 26 | 27 | 10 | 1 | 943 | 1181 | 13.2 | 17.3 | 32 |
| 4 | b | 55 | 2 | 19 | 21 | 9 | 13 | 1090 | 1227 | 11.0 | 15.2 | 40 |
| 5 | b | 43 | 2 | 29 | 31 | 10 | 14 | 946 | 1180 | 11.0 | 14.9 | 33 |
| 6 | c | 55 | 2 | 19 | 21 | 9 | 13 | 1083 | 1228 | 11.4 | 15.4 | 32 |
| 7 | d | 54 | 2 | 20 | 23 | 12 | 9 | 903 | 1212 | 10.9 | 16.2 | 46 |
| 8 | d | 54 | 2 | 20 | 23 | 12 | 9 | 974 | 1205 | 10.2 | 14.9 | 50 |
| 9 | e | 35 | 1 | 46 | 47 | 14 | 3 | 933 | 1142 | 10.4 | 14.3 | 37 |
| 10 | f | 41 | 1 | 38 | 40 | 16 | 2 | 952 | 1111 | 12.7 | 16.9 | nd |

In this Table, "nd" means that the value was not determined. The underlined values are not in accordance with the invention.

Examples 1-8 all have a C content in the tempered martensite lower than 0.45%.

Examples 1-8 show that with a method according to the invention, steel sheets having a tensile strength of at least 1180 MPa and a total elongation of at least 12%, and even of at least 13% can be obtained. These steel sheets have a yield strength of at least 900 MPa, a uniform elongation of at least 9.0%, and generally of more than 11%, and a hole expansion ratio HER of at least 25%, and even of at least 30%. The yield strength and the total elongation are measured according to the ISO standard 6892-1. The expansion ratio HER is measured according to the ISO standard 16630:2009.

By contrast, examples 9 and 10 show that if the Si+Al content is below 1.7%, a tensile strength of at least 1180 MPa is not obtained.

A micrograph of the microstructure of example 3 is shown on the appended FIGURE. On this FIGURE, RA designates the retained austenite, TM designates the tempered martensite and IF designates the intercritical ferrite.

The sheet according to the invention is weldable by resistance spot welding and can be used for the manufacture of various welded structures. But, when it is coated by Zn or Zn alloys, it is also weldable if its composition satisfies the conditions C+Si/10≤0.30% and Al≥6(C+Mn/10)−2.5%.

In particular, a welded structure, including resistance spot welds, of at least two steel sheets, can be produced by producing a first steel sheet by a method according to the invention, the first sheet being such that C+Si/10≤0.30% and Al≥6(C+Mn/10)−2.5% and being coated with Zn or a Zn alloy, providing a second steel sheet having a composition such that C+Si/10≤0.30% and Al≥6(C+Mn/10)−2.5%, and resistance spot welding the first steel sheet to the second steel sheet. The second steel sheet may for example be produced by a method according to the invention, and coated with Zn or a Zn alloy.

Thus, a welded structure having a low LME sensitivity is obtained. For example, for such a welded structure comprising at least ten resistance spot welds, the mean number of cracks per resistance spot weld is less than 6.

The steel sheets optionally welded by resistance spot welding according to the invention are used with profit for the manufacture of structural parts in motor vehicles since they offer high formability during the fabrication process and high energy absorption in case of collision. The resistance spot welds according to the invention are also used with profit for the manufacture of structural parts in motor vehicles, since eventual initiation and propagation of cracks located in the welded zones are much reduced.

What is claimed is:

1. A method for producing an uncoated steel sheet having a tensile strength of at least 1180 MPa, a yield strength of at least 900 MPa, a total elongation of at least 12%, measured according to the ISO standard 6892-1:2009, and a hole expansion ratio HER of at least 25%, measured according to the ISO standard 16630:2009, wherein the method comprises the following successive steps:
   providing a cold-rolled steel sheet made of a steel having a chemical composition containing by weight:
   0.15%≤C≤0.23%,
   2.0%≤Mn≤2.8%,
   1.0%≤Si≤2.1%,
   0.02%≤Al≤1.0%,
   with 1.7%≤Si+Al≤2.1%,
   0≤Nb≤0.035%,
   0≤Mo≤0.3%,
   0≤Cr≤0.4%, and
   a remainder, the remainder being Fe and unavoidable impurities,
   annealing the steel sheet at an annealing temperature TA so as to obtain a structure comprising at least 65% of austenite and up to 35% of intercritical ferrite,
   quenching the steel sheet to a quenching temperature QT comprised between 180° C. and 260° C., with a cooling rate of at least 20° C./s from a temperature of at least 600° C. down to the quenching temperature QT, and holding the steel sheet at the quenching temperature QT for a holding time comprised between 2 s and 8 s,
   reheating the steel sheet from the quenching temperature QT up to a partitioning temperature PT comprised between 350° C. and 450° C.,
   maintaining the steel sheet at the partitioning temperature PT for a partitioning time Pt comprised between 80 s and 440 s, and
   after the maintaining at the partitioning temperature PT, immediately cooling the steel sheet down to the room temperature so that the steel sheet has a final microstructure and is uncoated,
   the final microstructure consisting of, in surface fraction:
   between 40% and 70% of tempered martensite, the tempered martensite having a C content lower than 0.45%,
   between 9% and 15% of retained austenite,
   between 15% and 35% of ferrite,
   between 2% and 5% of fresh martensite, and
   at most 15% of bainite.

2. The method according to claim 1, wherein the C content in the tempered martensite is lower than 0.03%.

3. The method according to claim 1, wherein the method comprises, between the annealing and the quenching, a step of slow cooling the steel sheet at a cooling rate lower than 5° C./s for at least 70 s, down to the temperature of at least 600° C.

4. The method according to claim 3, wherein the ferrite comprises, in area fraction with respect to the whole structure, between 0% and 15% of intercritical ferrite and between 0% and 35% of transformation ferrite, the transformation ferrite being formed during the slow cooling step.

5. The method according to claim 1, wherein the steel sheet has, after the quenching and before the heating to the partitioning temperature PT, a structure consisting of, in surface fraction:
   between 15% and 35% of ferrite,
   between 10% and 30% of austenite,
   between 40% and 70% of martensite, and
   at most 15% of lower bainite.

6. The method according to claim 1, wherein the step of providing the cold-rolled steel sheet comprises:
   hot rolling a sheet made of said steel to obtain a hot-rolled steel sheet,
   coiling the hot-rolled steel sheet at a temperature Tc comprises between 400° C. and 750° C.,
   performing a batch annealing at a temperature THBA comprised between 500° C. and 700° C. for a time between 2 and 6 days, and
   after performing the batch annealing, cold rolling the hot-rolled steel sheet to obtain the cold-rolled steel sheet.

7. The method according to claim 1, wherein the chemical composition of the steel satisfies at least one of the following conditions:

C≥0.16%,
C≤0.21%,
Mn≥2.2%,
Mn≤2.7%,
0.010%≤Nb,
Mo≤0.05%, or
Mo≥0.1%,
Cr≤0.05%, or
Cr≥0.1%.

8. The method according to claim 1, wherein the chemical composition of the steel is such that C+Si/10≤0.30% and Al≥6 (C+Mn/10)−2.5%.

9. The method according to claim 8, wherein the chemical composition of the steel is such that 1.0%≤Si<1.3% and 0.5%<Al≤1.0%.

10. The method according to claim 9, wherein 1.0%≤Si≤1.2% and 0.6%≤Al≤1.0%.

11. The method according to claim 1, wherein the chemical composition of the steel is such that 1.3%≤Si≤2.1% and 0.02%≤Al≤0.5%.

12. The method according to claim 1, wherein, after the steel sheet is quenched to the quenching temperature QT and before the steel sheet is heated to the partitioning temperature PT, the steel sheet is held at the quenching temperature QT for a holding time comprised between 3 s and 7 s.

13. The method according to claim 1, wherein the surface fraction of retained austenite is of at least 11%.

14. A method for producing an uncoated steel sheet having a tensile strength of at least 1180 MPa, a yield strength of at least 900 MPa, a total elongation of at least 12%, measured according to the ISO standard 6892-1:2009, and a hole expansion ratio HER of at least 25%, measured according to the ISO standard 16630:2009, wherein the method comprises the following successive steps:
  providing a cold-rolled steel sheet made of a steel having a chemical composition containing by weight:
    0.15%≤C≤0.23%,
    2.0%≤Mn≤2.8%,
    1.0%≤Si≤2.1%,
    0.02%≤Al≤1.0%,
    with 1.7%≤Si+Al≤2.1%,
    0≤Nb≤0.035%,
    0≤Mo≤0.3%,
    0≤Cr≤0.4%, and
    a remainder, the remainder being Fe and unavoidable impurities,
  annealing the steel sheet at an annealing temperature TA so as to obtain a structure comprising at least 65% of austenite and up to 35% of intercritical ferrite,
  quenching the steel sheet to a quenching temperature QT comprised between 180° C. and 260° C., with a cooling rate of at least 20° C./s from a temperature of at least 600° C. down to the quenching temperature QT, and holding the steel sheet at the quenching temperature QT for a holding time comprised between 2 s and 8 s,
  reheating the steel sheet from the quenching temperature QT up to a partitioning temperature PT comprised between 350° C. and 450° C.,
  maintaining the steel sheet at the partitioning temperature PT for a partitioning time Pt comprised between 80 s and 440 s, and
  after the maintaining at the partitioning temperature PT, immediately cooling the steel sheet down to the room temperature so that the steel sheet has a final microstructure and is uncoated,
  the final microstructure consisting of, in surface fraction:
  between 40% and 70% of tempered martensite, the tempered martensite having a C content lower than 0.45%,
  between 7% and 15% of retained austenite,
  between 15% and 35% of ferrite,
  at most 5% of fresh martensite, and
  at most 15% of bainite
wherein the step of providing the cold-rolled steel sheet comprises:
  hot rolling a sheet made of said steel to obtain a hot-rolled steel sheet,
  coiling the hot-rolled steel sheet at a temperature Tc comprises between 400° C. and 750° C.,
  performing a batch annealing at a temperature THBA comprised between 500° C. and 700° C. for a time between 4 and 6 days, and
  after performing the batch annealing, cold rolling the hot-rolled steel sheet to obtain the cold-rolled steel sheet.

15. The method according to claim 1, wherein the temperature THBA of the batch annealing is comprised between 500° C. and 640° C.

* * * * *